US008525834B2

(12) United States Patent
Salemann

(10) Patent No.: US 8,525,834 B2
(45) Date of Patent: Sep. 3, 2013

(54) VOXEL BASED THREE DIMENSIONAL VIRTUAL ENVIRONMENTS

(75) Inventor: Leo Salemann, Sammamish, WA (US)

(73) Assignee: Lockheed Martin Corporation, Bethesda, MD (US)

( * ) Notice: Subject to any disclaimer, the term of this patent is extended or adjusted under 35 U.S.C. 154(b) by 626 days.

(21) Appl. No.: 12/707,078

(22) Filed: Feb. 17, 2010

(65) Prior Publication Data

US 2011/0199376 A1 Aug. 18, 2011

(51) Int. Cl.
*G06T 17/00* (2006.01)
(52) U.S. Cl.
USPC ............ 345/424; 345/419; 345/619; 707/758
(58) Field of Classification Search
USPC ............. 382/154; 345/428, 419, 424; 701/3, 701/2; 348/584
See application file for complete search history.

(56) References Cited

U.S. PATENT DOCUMENTS

| | | | | |
|---|---|---|---|---|
| 5,166,876 | A | * | 11/1992 | Cline et al. ..................... 345/424 |
| 5,684,935 | A | * | 11/1997 | Demesa et al. ............... 345/419 |
| 2006/0164417 | A1 | * | 7/2006 | Donovan et al. .............. 345/428 |
| 2007/0162195 | A1 | * | 7/2007 | Garceau et al. ................... 701/3 |
| 2007/0236502 | A1 | * | 10/2007 | Huang et al. ................... 345/473 |
| 2007/0280528 | A1 | * | 12/2007 | Wellington et al. ........... 382/154 |
| 2008/0262813 | A1 | * | 10/2008 | Rhodes et al. .................. 703/11 |
| 2009/0099824 | A1 | * | 4/2009 | Falash et al. ..................... 703/8 |
| 2009/0237564 | A1 | * | 9/2009 | Kikinis et al. ................ 348/584 |
| 2010/0017046 | A1 | * | 1/2010 | Cheung et al. .................... 701/2 |
| 2010/0100520 | A1 | * | 4/2010 | Dargue et al. .................. 706/47 |
| 2011/0288714 | A1 | * | 11/2011 | Flohr et al. ..................... 701/27 |

OTHER PUBLICATIONS

Lalonde, J., et al., "Natural terrain classification using three-dimensional ladar data for ground robot mobility," [online] Journal of Field Robotics, vol. 23, No. 10, Nov. 2006, pp. 839-861, retrieved from the Internet: <http://www.ri.cmu.edu/publication_view.html?pub_id=5611>.
Pollard, T., et al., "Change Detection in a 3-D World," [online] 2007 IEEE Conference on Computer Vision and Pattern Recognition, Jun. 17-22, 2007, retrieved from the Internet: <www.lems.brown.edu/~tpollard/pollard_mundy_cvpr07.pdf>.
Mundy, J., et al., "Uncertain geometry: a new approach to modeling for recognition," [online] Proceedings of the SPIE, Automatic Target Recognition XIX, vol. 7335, pp. 73350Q-73350Q-12, May 4, 2009, retrieved from the Internet: <http://www.lems.brown.edu/~ozge/SPIE-Mundy-OzcanliFinal.pdf>.
Gebhardt, S., et al., "Polygons, point clouds, and voxels, a comparison of high-fidelity terrain representations," 2009 SIWZIE Awards, Simulation Interoperability Standards Organization, Nov. 20, 2009.

\* cited by examiner

*Primary Examiner* — Phi Hoang
(74) *Attorney, Agent, or Firm* — Terry M. Sanks, Esq.; Beusse Wolter Sanks Mora & Maire, P.A.

(57) ABSTRACT

Geospatial information specific to a real-world volumetric space can be gathered. The gathered information can be stored in a voxel database. The stored information can be indexed against voxels, which correspond to volume units of the real-world volumetric space. Stored information can be extracted from the voxel database. The extracted information can be directly inserted into an interactive three dimensional (3D) application providing a simulation space. The 3D application can interactively presents 3D entities programmed with entity specific intelligence within the simulation space. Each 3D entity can dynamically move and react in the simulation space in a geospatially constrained manner in accordance with the entity specific intelligence and in accordance with limitations of the simulation space.

24 Claims, 10 Drawing Sheets

Voxel Table 610

| VID | SID | SAttr1_Lower | SAttri1_Upper | SAttri2_Lower | SAttri2_Upper ... |
|---|---|---|---|---|---|
| 1 | 1 | M1L VAL | M1U VAL | M2L VAL | M2U VAL |
| 2 | 1 | N1L VAL | N1U VAL | N2L VAL | N2U VAL |
| 3 | 2 | O1L VAL | O1U VAL | O2L VAL | O2U VAL |
| 4 | 3 | P1L VAL | P1U VAL | P2L VAL | P2U VAL |
| 5 | 3 | Q1L VAL | Q1U VAL | Q2L VAL | Q2U VAL |

Shape 3D Table 620

| SID | FID | Type | X | Y | Z | * | * | * |
|---|---|---|---|---|---|---|---|---|
| 1 | 1 | Box | * | * | * | * | * | * |
| 2 | 2 | *Box* | * | * | * | * | * | * |
| 3 | 2 | *Box* | * | * | * | * | * | * |
| 4 | 2 | *Box* | * | * | * | * | * | * |
| 5 | 3 | Box | * | * | * | * | * | * |
| 6 | 4 | Cylinder | * | * | * | * | * | * |
| 7 | 4 | Cylinder | * | * | * | * | * | * |
| 8 | 4 | Cylinder | * | * | * | * | * | * |
| 9 | 4 | Cylinder | * | * | * | * | * | * |
| 10 | 5 | Cylinder | * | * | * | * | * | * |
| 11 | 5 | Cylinder | * | * | * | * | * | * |

632 Building Feature Table

| FID | Name | Address | | | |
|---|---|---|---|---|---|
| 1 | RI Hospital Trust | 123 4th St | * | * | * |
| 2 | *Kennedy Plaza* | *567 8th Ave* | * | * | * |
| 3 | Webster Bank | 91011th Pl | * | * | * |

632 Tree-Grove Feature Table

| FID | Name | Genus | | | |
|---|---|---|---|---|---|
| 4 | Kennedy Park | Conifer | * | * | * |
| 5 | Market Square | Deciduous | * | * | * |
| 99 | Specific Attr | Specific Attr | * | * | * |
| 199 | Specific Attr | Specific Attr | * | * | * |
| 999 | Specific Attr | Specific Attr | * | * | * |

FIG. 6

VOXEL BASED THREE DIMENSIONAL VIRTUAL ENVIRONMENTS

BACKGROUND

The present disclosure relates to the field of three-dimensional virtual environments, and, more particularly, to voxel based three dimensional (3D) virtual environments.

In computing environments, virtual entities (avatars, for example) are often moved about a three dimensional virtual environment, where the virtual entities are controlled by users and/or by computer based intelligence. Semi-automated forces (SAF) are one implementation specific (and non-limiting) example of an application functioning within a three dimensional virtual environment. More specifically, SAF are computer-generated forces (CGF) that react in a manner similar to real forces using computer models that determine decision making aspects of the simulated force entities. That is, the simulated force entities are programmed with the doctrine and behavior associated with a corresponding real-world entity being simulated, so that during an exercise, they move and react in a realistic manner over a simulation space. The simulation space can be a geo-specific synthetic environment of a battlefield, generated from digital mapping data.

SAF applications and components require highly complex terrain representations (e.g., Synthetic Natural Environments (SNE) or Terrain Database (TDB)) in order to operate. Producing these SNEs and/or terrain databases is labor and cost intensive. Prior approaches build SAF environments from digital mapping data. The digital mapping data is usually a combination of Digital Elevation Model (DEM) data and a set of vector layers, such as road centerlines, water areas, and building footprints. In some cases, the vector data can be aligned to terrain imagery or can be extracted from imagery through semi-automated means. The vector data, imagery data, and DEM data are obtained from different sources and are collected at different times. Moreover, DEMs and vector layers can require months to years to create from raw earth measurements making it difficult (if not impossible using current techniques) to build SAF compatible SNEs from current geospatial data.

BRIEF SUMMARY

The disclosure provides a three dimensional virtual environment that includes a plurality of interactive three dimensional entities. The three dimensional virtual environment can runs natively on a volumetric terrain model. In one embodiment, relatively raw data direct from sensors can be mapped from a real-world volumetric space to a volumetric storage space. This information can include geospatially mapped semantic information. The semantic data and volumetric terrain data can be used to drive behavior of computer controlled 3D entities of an interactive 3D application. In the disclosure, a simulation space can be generated directly from the volumetric storage space, after the optional application of data filters. 3D entities can navigate the simulation space, which is expressible within an interactive user interface.

One aspect of the disclosure is for creating data sets for interactive 3D environments. In the aspect, geospatial information specific to a real-world volumetric space can be gathered. The gathered information can be stored in a voxel database. The stored information can be indexed against voxels, which correspond to volume units of the real-world volumetric space. Stored information can be extracted from the voxel database. The extracted information can be directly inserted into application components. The application components can be utilized by an interactive 3D application that interactively presents 3D entities programmed with entity specific intelligence within the simulation space. Each 3D entity can dynamically move and react in the simulation space in a geospatially constrained manner in accordance with the entity specific intelligence. At least one of the 3D components can be a terrain component, which comprises a voxel encoded terrain map corresponding to at least a portion of the real-world volumetric space, which is directly consumable by a raster-based terrain engine of a simulation device presenting the interactive user interface that expresses the simulation space.

Another aspect of the disclosure includes a set of sensor captured products that can be obtained from a real-world space. These products can be fused together, such that each voxel in the voxel database represents the summation (or average) of all source products. A product generation request can be received. The request can specify a bounded simulation space volume for the 3D product. The voxel database can be queried for a set of voxel units contained within a volume of voxel space corresponding to the bounded simulation space. A product data set can be responsively generated that comprises simulation units corresponding to the voxel units in a one-to-one manner. The product data set can include visual information necessary to drive a voxel graphics engine of a simulator to render a three-dimensional environment for the bounded simulation space. The product data set can also include non-visual semantic information necessary to drive behavior of computer generated forces acting in the bounded simulation space.

Another aspect of the disclosure is for a voxel database managing information within an indexed tangible storage medium. The voxel database can include a set of voxel records in a voxel table. Each of the voxel records can have a unique voxel identifier. Each voxel record can include visual attributes of a geometric space, wherein uniquely defined voxels of a voxel database is the volume unit on a grid in three dimensional space, which is a voxel space. A one-to-one correspondence can exist between voxels in the voxel space and volume units of a real world volumetric space from which geospatial data was directly gathered and encoded within the voxel database. The voxel database can also include a set of entity records, wherein each record has a unique identifier for a simulated force entity. Each entity record can be indexed against at least one voxel record within the voxel database. Each entity record can include a set of different attributes for characteristics of the corresponding simulated force entity. The different attributes of the entity records can comprise sufficient information to permit a 3D application consuming the information to drive behavior of a computer generated force entity acting in a simulation space comprising simulation units corresponding to voxels of the voxel database.

BRIEF DESCRIPTION OF THE SEVERAL VIEWS OF THE DRAWINGS

FIG. 6 illustrates a set of tables for a voxel GIS in accordance with an embodiment of the disclosure.

DETAILED DESCRIPTION

Figure 1:
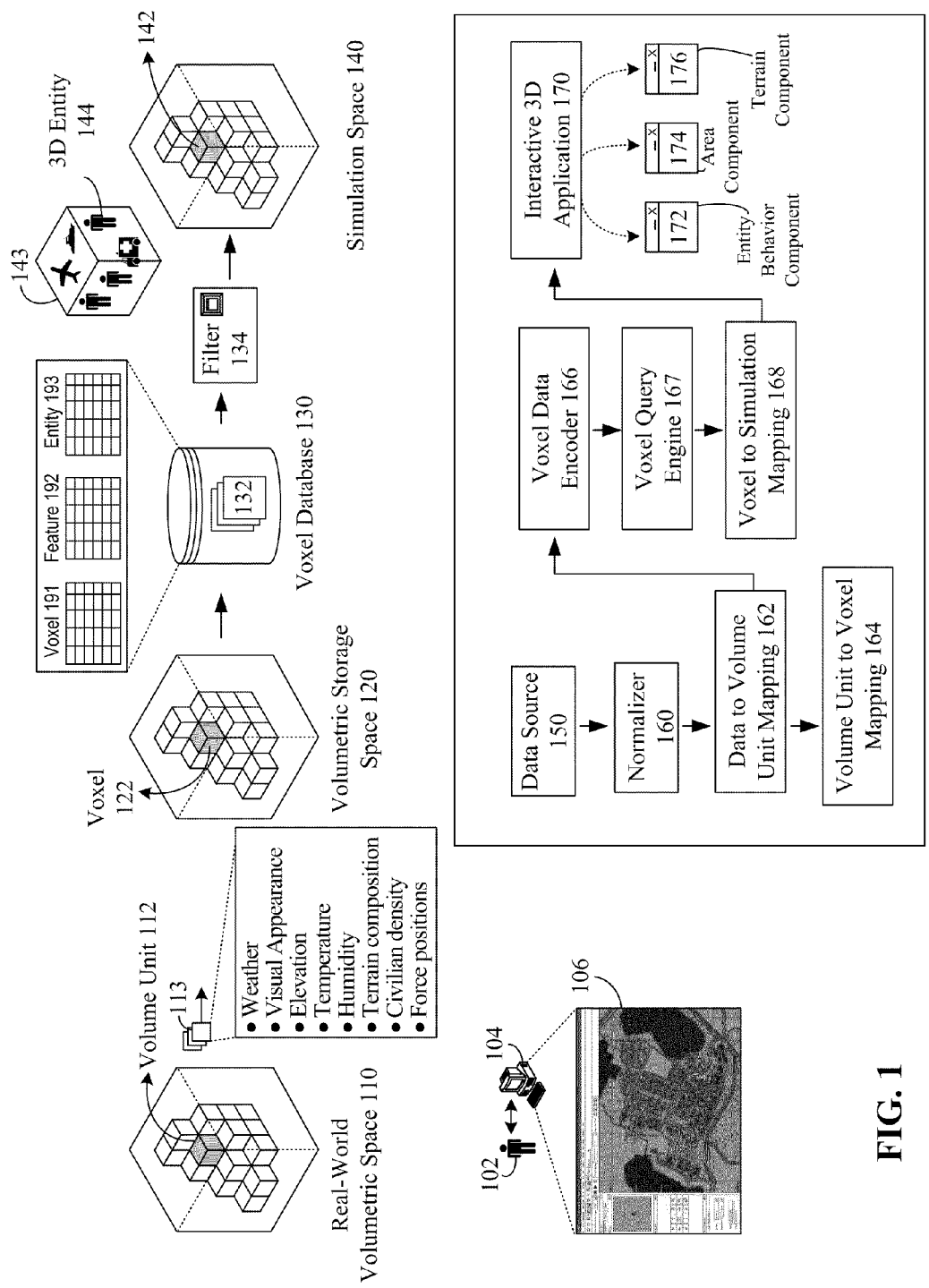
FIG. 1 is a schematic diagram showing a voxel database managing spatially referenced behavioral data for a simulated population in accordance with an embodiment of the disclosure.

The disclosure provides a three dimensional virtual environment (e.g., an environment represented by simulation space 140) in which user-controlled and/or computer logic controlled entities 144 interact with one another. These entities 144 can dynamically move and react within the three dimensional virtual environment. In the disclosure, a volumetric storage space 120 is used to detail specifics for the entities 130 and the three dimensional virtual environment.

The volumetric storage space 120 can be a space composed of a set of volumetric units, called voxels 122. Data elements can be directly referenced to voxels 122, which permits these data elements to be spatially placed in the volumetric storage space 120. The data elements need not have any specific identity outside their relationship to the voxels 122, which permits raw data to be inserted into the volumetric storage space 120. For example, satellite imagery, LIDAR points, and other information can all be inserted into the volumetric storage space 120 and referenced to voxels 122. Viewed in one manner, each voxel 122 can be thought of as a three dimensional puzzle piece that fits together with other puzzle pieces to form the volumetric storage space 120. Information included in the volumetric storage space 120 can be extracted post-storage. For example, outlines of objects can be detected within the volumetric storage space 120 to determine a presence or absence of a building, vehicle, crowd, or other object within the volumetric storage space 120.

It should be noted that data elements can be continuously inserted into the volumetric storage space. In this manner, data elements can be combined to continuously increase a "resolution" of the data image contained within the volumetric storage space 120. In one embodiment, the volumetric storage space 120 can be a probabilistic one. In other words, data elements can be stored in the volumetric storage space 120 that have a probability of being contained therein but have a probability of not actually being contained therein. For example, if an incomplete "data image" of a building (which can be formed by 1 . . . N quantity of voxels) exists in the volumetric storage space 120, an associated probability of the building being present in the volumetric storage space 120 can be at a value of forty percent where a sixty percent probability value exists that the building is not present in the volumetric storage space 120. Thus, the volumetric storage space 120 is able to handle uncertainty of data elements in a manner that traditional storage spaces cannot.

The volumetric storage space 120 can store data elements of any nature. For example, the data elements of the volumetric storage space 120 can include visual information in two or three dimensions. Data elements can also include material composition elements, elevation data, and the like. Any type of information that can be spatially related to a volumetric unit (e.g., voxel) can be stored in the volumetric storage space 120.

Another way of expressing the volumetric storage space 120 is by using database terminology. Stated differently, each voxel 122 can have a unique identifier, which in a database system (e.g., database 130) can be a primary key of a database table having voxel records. Data elements of the volumetric storage space 120 can be attributes of the voxel records. Relative reference points of data elements within a corresponding voxel can be optionally recorded, should a spatial positioning of a data element be needed at a level of granularity less than a single voxel 122. The only linkage of each data element within the database 130 can be defined by its relationship to a voxel 122. That is, instead of referencing visual, material, or other characteristics of a building to that building, as would be the case with a standard database—visual, material, or other characteristics can be referenced directly to voxels 122.

This ability to relate any number of characteristics (e.g., data elements) having a spatial component to the volumetric storage space 120 at a suitable spatial location (via voxel referencing) is significant and unique to a voxel database 130. It is this ability that permits "raw" data to be directly inserted into the volumetric storage space 120. The raw data (e.g., satellite data, for example) when acquired is typically formatted in a spatial manner well suited for proper insertion into the volumetric storage space 120. Otherwise, input acquired from satellites (or similar sources) must be processed and categorized to specific objects (e.g., buildings, roads, etc). These objects are typically stored in databases as discrete entities having object specific attributes. Each time processing occurs, a data loss can result, as assumptions, which must be made during processing, may not be true. For example, during processing, material composition attributes are historically stored against to objects (e.g., buildings, roads, etc.) formed from these materials. There may be, however, uncertainty in which of a set of possible objects are actually present in a given spatial region. Thus, during processing, material composition attributes can be stored against the wrong objects. Conventional practices (that do not utilize a volumetric storage space 120) may attempt to correct for processing errors, as described above. Error correction techniques, however, do not change the fact that there is a fundamental disconnect with the paradigm used for storing data given the manner in which this data is acquired. Use of a volumetric storage space 120 is believed to resolve this disconnect, and believed to achieve numerous advantages as described herein.

FIG. 1 is a schematic diagram 100 showing a voxel database 130 for interactive three dimensional (3D) applications 170 in accordance with an embodiment of the disclosure. The interactive 3D application 170 can be a computer-based application or application component that generates entity (144) level simulations which interact individually in a simulation space 140. In various embodiments, the interactive 3D application 170 can be an entity-level constructive simulation or an aggregate-level constructive simulation. In entity-level constructive simulations, a 3D entity 144 can be a soldier, a tank, a plane, etc. In aggregate-level constructive simulations, the 3D entity 144 can be a patrol, squadron, company, brigade, etc. In one embodiment, the interactive 3D applications 170 can conform to a variety of known SAF embodiments, such as a Modular Semi-Automated Forces (ModSAF) embodiment, a Joint Semi-Automated Forces (JSAF) embodiment, a One Semi-Automated Forces (OneSAF) embodiment, a Warfighters' Simulation (WARSIM) embodiment, a Joint Conflict and Tactical Simulation (JCATS)

embodiment, a brigade and battalion simulation (BBS) embodiment, and the like. Whether interactive 3D application 170 is fully compliant with a known SAF embodiment or not, it can and can leverage technologies utilized by them (e.g., ModSAF, JSAF, OneSAF, etc.) to perform the functions detailed herein. Interactive 3D applications 170 are not limited to a SAF context.

Interactive 3D applications 170 can permit a single operator (user 102) create and control large (1 . . . N) numbers of entities 144 that are used for realistic training, test, gaming, and evaluation on a virtual battlefield (or other defined 3D environment), defined within simulation space 140. Individual entities 144 can be geospatially (within space 140) defined and reactive. The entities 144 can include infantrymen, civilians, tanks, ships, airplanes, munitions, buildings, sensors, dynamic structures, patrol, squadron, company, brigade, armies, units, and the like. The entities 144 can be controlled separately or organized into appropriate units for a given simulated mission.

In one embodiment, the interactive 3D application 170 can be part of an interactive multi-user simulation environment, where one or more of the entities 144 presented in simulation space can be manipulated by humans. Concurrently, other entities 144 of the multi-user simulation environment can be programmatically controlled to behave in a sufficiently realistic manner. A user 102 can be unaware or uncertain whether an entity 144 displayed in user interface 106 is being controlled by a computer or by a human operator.

The user interface 106 can present an interactive region (in two or three dimensions) of a simulation space 140. The user interface 106 can be presented upon a computing device 104. 3D interactive simulations (or interfaces) can run locally on device 104 or can be distributed across multiple networked nodes. In one embodiment, multiple federations or collections of simulation components (executing on multiple physical computing devices in a distributed computing space) can interact with a simulation environment that includes the simulation space 140.

The simulation space 140 can represent real-world terrain, oceans, and weather conditions that affect the behaviors and capabilities of the entities 144. A volume region 143 of the simulation space consisting of one or more (1 . . . N) simulation units 142 can include a set of 3D entities 144. Simulation units 142 can map to voxels 122. In one embodiment, behaviors of the entities 144 can also be affected by line of sight, time of day, currents, tides, slope, smoke, soil conditions, water depth, cloud cover, and other factors. Additionally, behavior of entities 144 can vary based on cultural, political, and psychological factors. This level of simulation accuracy can require a vast amount of data to drive the simulations. This data is derived from real world (volumetric space 110) information 113 captured by real-world sensors. The information 113 can be placed in volumetric storage space 120 and can be centrally managed and stored in voxel database 130.

The voxel database 130 can be a database of a geographic information system (GIS) that captures, stores, analyzes, manages, and/or presents data that is linked to a location. In the database 130, records 132 can be mapped or related to voxels 122, each of which has a unique identifier. Each voxel 122 can be a volume element representing a value on a grid (regular or non-regular) in three dimensional space, specifically volumetric storage space 120. Various tables can be interrelated in database 130, such as voxel table 191 (each record having a unique voxel identifier), feature table 192 (each record having a unique feature identifier), entity table 193 (each record having a unique entity 144 identifier), and the like.

In one embodiment, volume units 112 from a real-world volumetric space can be directly mapped to voxels 122 of volumetric storage space 120. Any scale can exist between a volume unit 112 and a voxel 122. For example, for a given geographic region, one or more data sources 150 can utilize a set of sensors to capture and record data 113 for a specific volume unit 112. The data 113 can include images, video, unmanned vehicle feeds, signals intelligence (SIGINT) information, human intelligence (HUMINT) data, and the like. Semantic content of the data 113 can include weather, visual appearance, elevation, temperature, humidity, terrain composition, civilian density and location, force density and location, and other definable attributes of volume unit 112 and/or objects within volume unit 112.

Before converting data 113 into voxel 122 mapped records 132, the data 113 can be optionally normalized (by normalize 160) to a definable standard. A data to volume mapping unit 162 can determine which unit 112 data 113 elements correspond to. Then, volume unit to voxel mapping component 164 can determine which voxel 122 corresponds to which volume unit 112. The voxel database 130 can be associated with a voxel query engine 167, which permits records 132 to be retrieved based on requestor supplied criteria. Voxel data encoder 166 can digitally encode the data 113 into a voxel database 130 format.

In one embodiment, a set of optional filters 134 can be established between the voxel database 130 and a related simulation space 140. Filters 134 can include voxel to simulation mapping modules. Ultimately, interactive 3D application 170 and application components (e.g., components 172-176) data modules defining simulation space 140, entity 144 characteristics, and other simulation variables can be produced. These extracted information modules, which can be automatically created from voxel database 130, can be directly consumed by the interactive 3D application 170.

More specifically, an entity behavior component 172 can define behavioral characteristics of the 3D entity 144 based on corresponding behavioral characteristics entities (not shown) of the real-world volumetric space 110. The information of the real-world entities can be derived by analyzing the data 113 obtained from real-world volumetric space 110. In one embodiment, component 172 can be a component for a simulated military vehicle. Further, in one arrangement data 113 can include the algorithmic machinery or operational software/firmware of an unmanned vehicle, which is able to operate in real-world volumetric space 110. This software/firmware or portions thereof can be used for enabling entity 144 specific intelligence for a simulated military vehicle, which is able to operate in simulation space 140. In one embodiment, the entity behavior component 172 can be used as simulated intelligence for a simulated human. This simulated intelligence can be based on behavior of a specific real-world human as determined from the gathered information (113).

The area component 174 can define temporally dynamic characteristics of the simulation space 140 based on corresponding temporally dynamic conditions of the real-world volumetric space 110. For example, the temporally dynamic characteristics can include weather conditions of the simulation space 140 that correspond to weather conditions of the corresponding real-world volumetric space 110.

The terrain component 176 can include a voxel encoded terrain map corresponding to at least a portion of the real-world volumetric space 110. The terrain component can be directly consumable by a raster-based terrain engine of a simulation device presenting the interactive user interface that expresses the simulation space 140.

Figure 2A:
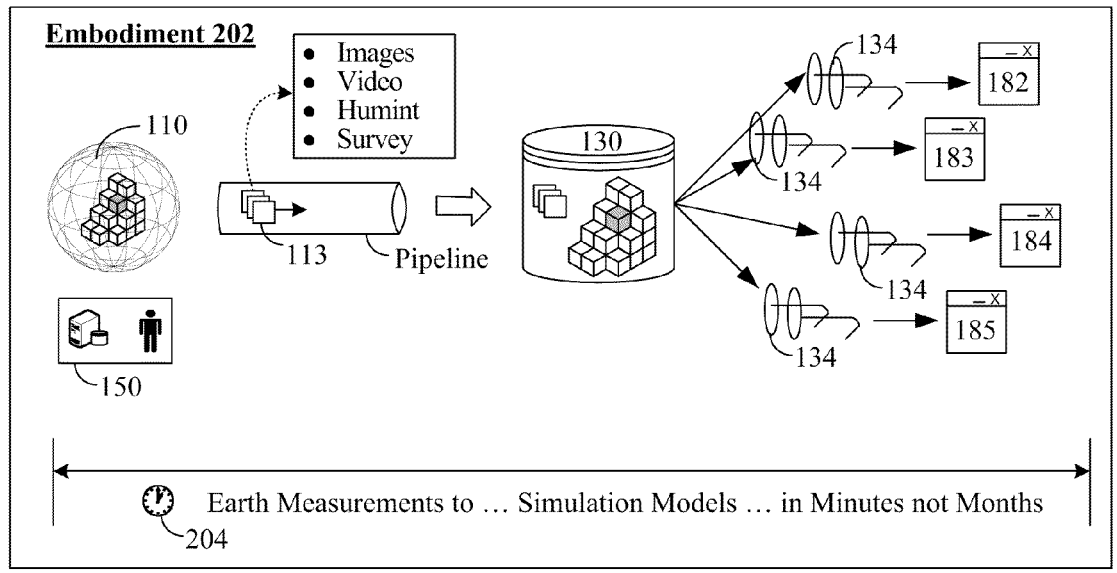
FIG. 2A describes an embodiment for populating and using a voxel database and a simulator able to consume data of the voxel database.
Figure 2A:
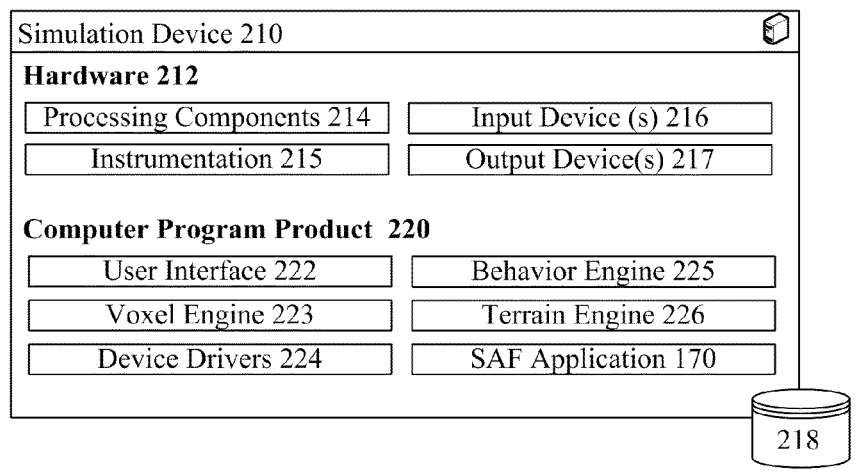

Embodiment 210 of FIG. 2A provides another description for populating and using voxel database 130. Using embodiment 210 as a description reference, data 113 captured from a real-world volumetric space 110 can be conveyed over a single pipeline to a Voxel database 130. The data 113 can come from many sources 150, such as satellite imagery, digital elevation model (DEM) data, video, SIGINT, HUMINT, and the like. Additionally, the filtered (134) voxel database 130 can provide data for multiple different types of simulators (simulation space 140). For example, assuming the simulators all include terrain models for a real-world volumetric space 110, SAF simulators 182, tactical engagement simulators (TES) 183, immersion simulators 184, behavioral simulators 185, and the like can all be generated from voxel database 130 stored records 132. Since interactive 3D applications 170 can be modular by nature, the various "simulators" 182-185 associated with different filters 134 can be SAF components (e.g., components 172-176) in one contemplated embodiment.

The common database 130 product can be a probabilistic one in which uncertainty is handled. In one embodiment, query engine 168 can include multiple different components for producing different queries (e.g., mission rehearsal query, training query, analysis query, etc.), which handle uncertainty in different manners for different types of consumers. It should be appreciated that embodiment 210 can be largely automated, which permits the process 204 from taking measurements, to producing simulation models to occur within minutes (under thirty minutes or under twenty four hours, for example) and not months, as is the case with conventional information gathering and modeling processes. Thus, in one embodiment, a real world (110) situation can be directly mapped to simulation space 140, in a rapid enough manner to permit users 102 to construct scenarios as part of a mission planning and/or mission rehearsal phase of an engagement.

FIG. 2A also shows a schematic diagram of a simulation device 210 for presenting and processing simulation space 140 data. Simulation devices 210 can vary greatly in terms of hardware 212 and computer program products 220 used, which causes user interfaces 222 (which includes interface 106, in one embodiment) to vary accordingly.

Figure 2B:
FIG. 2B shows embodiments for simulators and simulator interfaces in accordance with an embodiment of disclosure.

For example, interfaces 222 can include ones (e.g., embodiment 230 and 234 shown in FIG. 2B) having a top level map, through which a user 102 can interactively view, manipulate, and control groups of 3D entities 144; can include terrain manipulation interfaces permitting users to change geographic features of an environment which in turn changes geospatially dependent actions of the 3D entities 144; can include first person perspective interfaces (e.g., embodiment 232 shown in FIG. 2B) where a user can control a specific 3D entity 144 in simulation space 140 that interacts with other entities 144; and immersion interfaces (e.g., embodiment 233 and 235 shown in FIG. 2B) where a user or set of users can interact with simulation space 140 from within a mock vehicle or other physical construct.

The hardware 212 can include a number of components 214-218. Processing components 214 of the hardware 212 can include one or more microprocessors, memory, a bus, network cards, and the like. Instrumentation 215 can include radar displays, altimeters, speedometers, and other buttons and guages. Input devices 216 can include a keyboard, mouse, touch screen, joystick, cameras, movement detectors, pressure sensors, temperature sensors, laser sensors (e.g., Multiple Integrated Laser Engagement System (MILES) compliant ones) and the like. The output devices 217 can include visual displays, audio speakers, and/or other sensory output devices (e.g., somatosensory output devices, olfaction output devices, gustation output devices, etc.).

The computer program products 220 of the simulation device 210 can include user interface 222, voxel engine 223, interactive 3D application 170, device drivers 224, behavior engine 225, terrain engine 226, and the like. The device drivers 224 can facilitate communications between an operating system (not shown, but is one contemplated computer program product 220) and a specific hardware (such as devices 214-217).

Voxel engine 223 can be an engine able to consume data of the voxel database 130. In one embodiment, the engine 223 can process a set of voxels 122 or a portion of voxel space 120 consisting of any number of voxels. The voxel engine 223 can generate characteristics of a simulation space 140. For example, the voxel engine 223 can utilize or consume an area component 174 to simulate weather conditions for the simulation space 140.

Terrain engine 226 can be a raster-based graphics engine (as opposed to being vector based) that renders at least visual aspects of the simulation space 140. In one embodiment, voxel engine 223 can convert a format of data from a raw form to one directly consumable by terrain engine 226. In another embodiment, terrain engine 226 can directly utilize or consume voxel database generated components, such as terrain component 176.

In one embodiment, engine 223 can directly consume voxel-mapped social characteristic data, cultural condition data, and the like. Upon consumption, the voxel engine 223 can provide behavioral engine 225 with necessary data to drive the behavior of 3D entities 144. Alternatively, behavioral engine 225 can directly process information encoded in a voxel format, such as data contained in an entity behavior component 172. In one embodiment, the voxel engine 223 can handle uncertainty and can be inherently probabilistic in nature. In another embodiment, uncertainty in a data set can be removed before the data set is conveyed to voxel engine 223 for handling.

Figure 2C:
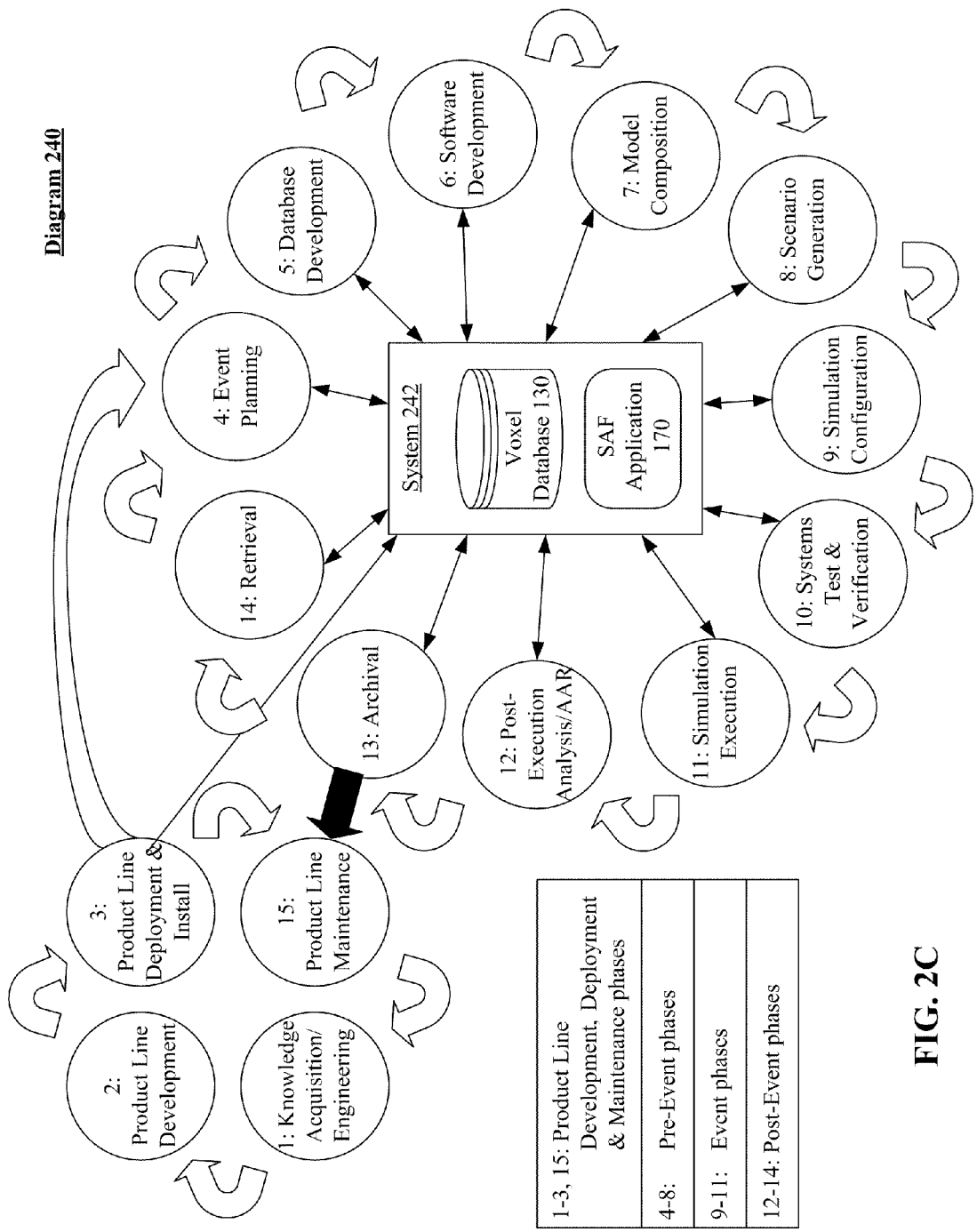
FIG. 2C shows a dynamic view of a product lifecycle in accordance with an embodiment of the disclosure.
Figure 2D:
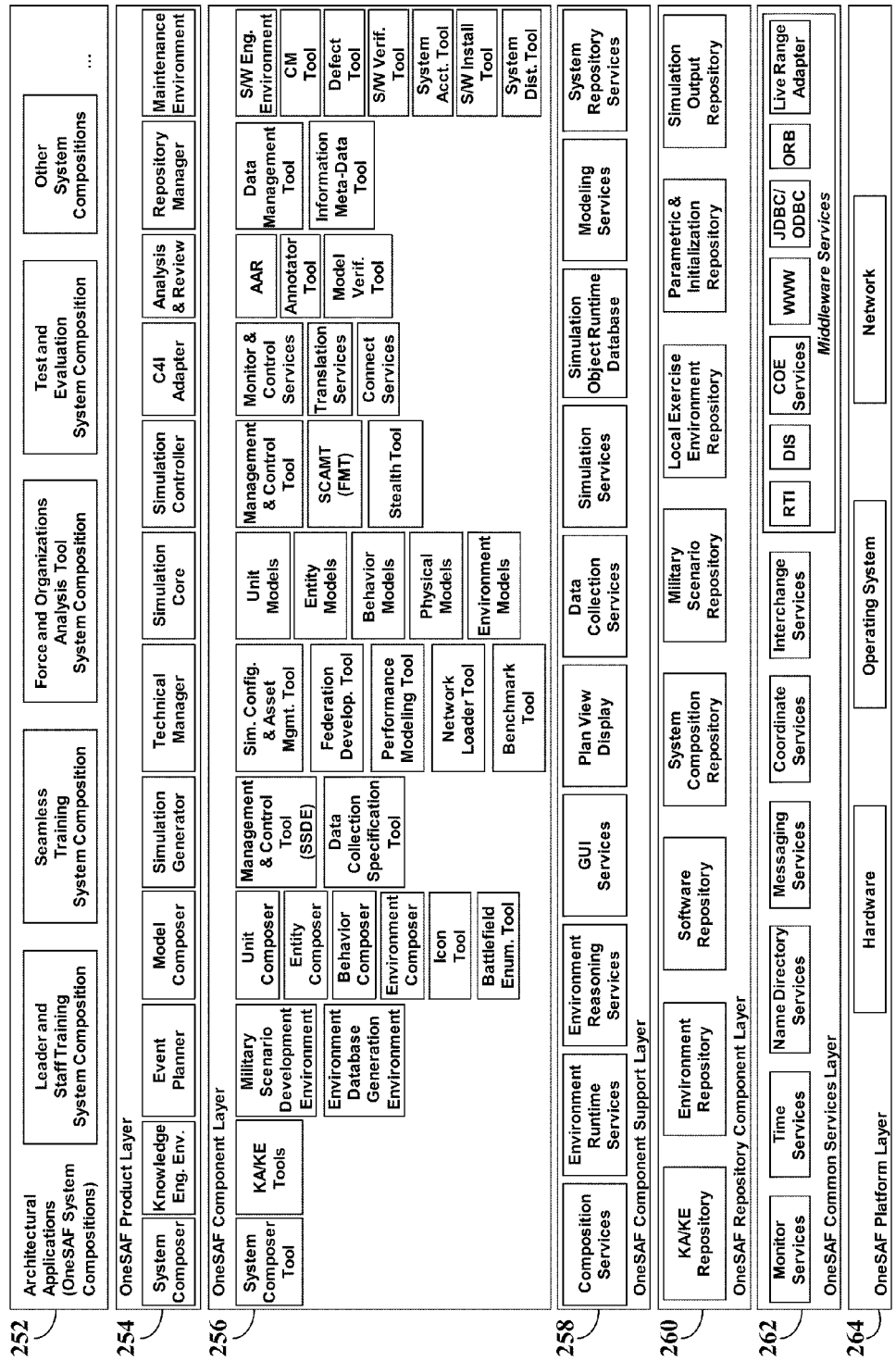
FIG. 2D shows an architecture for a system in accordance with an embodiment of the disclosure.

Diagram 240 of FIG. 2C shows a dynamic view of a 3D interactive application lifecycle in accordance with an embodiment of the disclosure. The specific lifecycle shown is for a SAF lifecycle, which is one contemplated, but non-limiting, embodiment of the disclosure. As shown, diagram 240 emphasizes that SAF (or other 3D interactive software program) lifecycle can include a mixture of selectively automated and manual activities in the various phases. When automated activities are selected, the overall data acquisition-to-model time (e.g., SAF specific process 204) can be expedited to under twenty four hours, and in some cases can occur in mere minutes. The voxel database 130 and the interactive 3D application 170 are together referred in diagram 240 to as the SAF system 242. That is, many of the phases of diagram 240 relate to populating and tailoring data of the database 130 and application 170 for a specific use. Thus, actual phases can include processing functions (i.e., creating and deploying filters 134; use of normalizer 160, use of mapping 152, use of mapping 164, use of encoding 166, use of mapping 168) not explicitly shown in diagram 240 for simplicity of expression.

Additionally, although diagram 240 shows lifecycle phases as sequential, this is a simplification for clarity. It should be understood that a streamlined lifecycle can omit certain activities and/or even phases all together, based on a particular mission and user needs.

The diagram 240 shows fifteen phases. Tools specifically mentioned within these phases can conform to a OneSAF model. The OneSAF model is used for illustrative purposes only and is not to be construed as limiting the scope of the disclosure.

The first three phases, knowledge acquisition/knowledge engineering (KA/KE), product line development, and product line deployment and Installation, are oriented toward deploying software 170 to sets of users. The remaining eleven phases that oriented toward application 170 use and database 130 population.

The knowledge acquisition and knowledge engineering (KA/KE) phase provides the mission space definitions and descriptions needed to correctly model platforms, units, and behaviors within system 242. The KA process collects accurate and validated descriptions of the significant elements of the mission space that are to be modeled within system 242. This domain description of the mission space is typically described from a real-world point of view. The KE process turns that domain knowledge into useful products that support software development.

In the product line development phase, underlying software development and integration activities are conducted that produce useful components and products that can be customized for specific use. This development and integration includes product line architecture development, including supporting infrastructure, tools, and examples. The inputs to product line development include the governing user requirements in the form of the operational requirements document (ORD), technical requirements found in the technical requirements document (TRD), and guidance provided by the operational concept document in the form of domain use cases, end state scenarios and operational architectures.

The product line deployment and installation phase makes system 242 user accessible. Deployment and installation takes a SAF encoded media (physical or virtual) and, using software installation tools, correctly places that software on the proper hardware resources at a user site if the site meets basic system requirements.

The event planning phase can occur prior to system 242 use. Typical training use cases will use training objectives as inputs to this phase, while typical analysis use cases will require experiment objectives.

The database development phase imports external data and processes for system 242 use. These activities include terrain data import and generation and the incorporation of characteristics and performance data needed by system 242 models.

In the software development phase, software modifications can occur that may be required for specific use cases. This may include the encoding of new or modified physical and behavioral models, development of primitive behaviors, and modifications to the system 242 infrastructure.

In the model composition phase, new behaviors, entities, and units for use in a specific system 242 scenario can be defined. Behaviors can be composed as combinations of behavior primitives and other behavior compositions. Entity composition includes the assembly of physical and behavioral capabilities into platforms. Unit composition includes the association of groups of entities and units into organizations, as well as the assembly of physical and behavioral capabilities specific to the unit.

In the scenario generation phase, military scenario information can be combined with simulation-specific data to produce a simulation scenario. This combination includes references to available terrain databases and dynamic environment configurations, real-world command and control assets to be included in the scenario, as well as available units, entities, and behaviors as specified. A data collection specification tool can be used to augment the simulation scenario with instructions to collect the data required for analysis within a particular scenario.

The simulation configuration phase can uses various tools to configure a system 242 site with the required executables distributed to the appropriate hosts. The heart of this activity can be performed by a system configuration and asset management tool (SCAMT), which produces a simulation configuration specification describing the configuration. This file can provide the system composer with the necessary information to build any specialized system 242 executables, which will be distributed by a simulation configuration tool. During this phase, resource estimation is performed to estimate required CPU, network, and disk resources required by the scenario. Processor allocation is performed by the SCAMT and recorded in the Simulation Configuration Specification. In addition, configurations for C4I interfaces (protocols, versions, registries, address books, etc.) are assigned based on what has been specified in the simulation scenario. If federating with external HLA systems, mapping between native system 242 data and external HLA FOM information can be performed during this phase.

The Systems Test phase includes dry-run execution to produce sample execution results, simulation data collection, and sample system performance data. The outputs of this dry run can be stored in a simulation output repository. Analysis of the system test can employs analysis and review tools to ensure that the required data has been collected and that the system is performing as expected. Verification of data collection ensures that enough information has been collected to generate desired AAR and analysis reports.

In the simulation execution phase, system 242 control can be employed to start and stop scenarios, provide human operator control inputs, schedule checkpoints and restarts, and to modify data collection requests. System monitoring can be performed to include system health and load status, federation management, and the real-time collection of data.

The post-execution analysis/after action review phase can analyzes the data produced in the execution phase. During this phase, data is imported into tools and manipulated to produce AAR or analysis result work products, including actual measures of effectiveness (MOEs) and Measures of Performance (MOPs).

In the archival phase, data repository data produced during previous lifecycle phases can be archived.

The retrieval phase can restore data repositories with data from previous archives (either remote or local) to support replay of past exercises or reuse of work products produced during any of the lifecycle phases.

In the product line maintenance phase, regular upgrade and maintenance actions for system 242 can be performed.

Diagram 250 emphasizes that a SAF system 242 is not a single system or product. It can instead be implemented as a set of components, which can be implemented in various layers of abstraction. Thus, diagram 250 shows a functional decomposition of capabilities that are able to be combined to satisfy requirements of system 242. Diagram 250 also shows that tools exist and can be provided to create various compositions. The diagram 250 is intended to illustrate one of many possible architectures for a SAF system, specifically it shows a particular OneSAF compliant architecture (e.g., a product line architecture framework (PLAF)). The invention is not to be construed as limited in this regard and use of other arrangements and architectures is contemplated.

In diagram 250, a number of layers (254-264) exist, where applications 252 and application components (such as SAF application 170) run on top of the highest layer 254. The layers 254-262 can include (from the lowest layer upwards) a product layer 264, a common services layer 262, a repository component layer 260, a component support layer 258, a component layer 256, and a product layer 254.

The platform layer 264 can provide access to the operating system, network, or other hardware specific interfaces.

The common services layer 262 can include those services that are commonly available as commercial off the shelf services (COTS). These services include database management, operating system time synchronization services, and network distribution services. Object Request Brokers (ORB) and the Run Time Infrastructure (RTI) also fall within this category of service.

The repository component layer 260 is the layer that contains the voxel database 130. The voxel database is a repository or an electronic storage mechanism that keeps all of the information, data, and meta-data for one logical area.

The component support layer 258 can include software services that are used by more than one component. The framework of diagram 250 can support the inclusion of multiple service implementations in order to support the varying components, products, and system compositions.

The component layer 256 can contain components that are to be developed independently in support of the products at the product layer 254. Specific products can use one or more of these components (of layer 256) in order to provide the necessary functionality. Multiple implementations of each of these components is supported by layer 256 in order to support a specific products having a specific composition. A single component implementation of layer 256 may support multiple products, multiple same kind products, and multiple compositions.

The product layer 254 can include products that are configured to support the mission area applications. Products of layer 254 can be top-level building blocks within the architecture shown in diagram 250. The products provide the specific functionality that support setting up, executing, and analyzing simulation results. Multiple implementations of each of these building blocks or products is supported in layer 254 in order to support the various system compositions.

The system composition layer 252 includes system compositions that provide configured end-user functionality for operational use. The system compositions of layer 252 can be created from products existing within the product layer 254. System compositions can support identified SAF end state scenarios and SAF operational use cases. Architectural applications can be general classes of system compositions that span the currently recognized SAF use cases. Specific system compositions can be instances of these architectural applications.

Figure 3A:
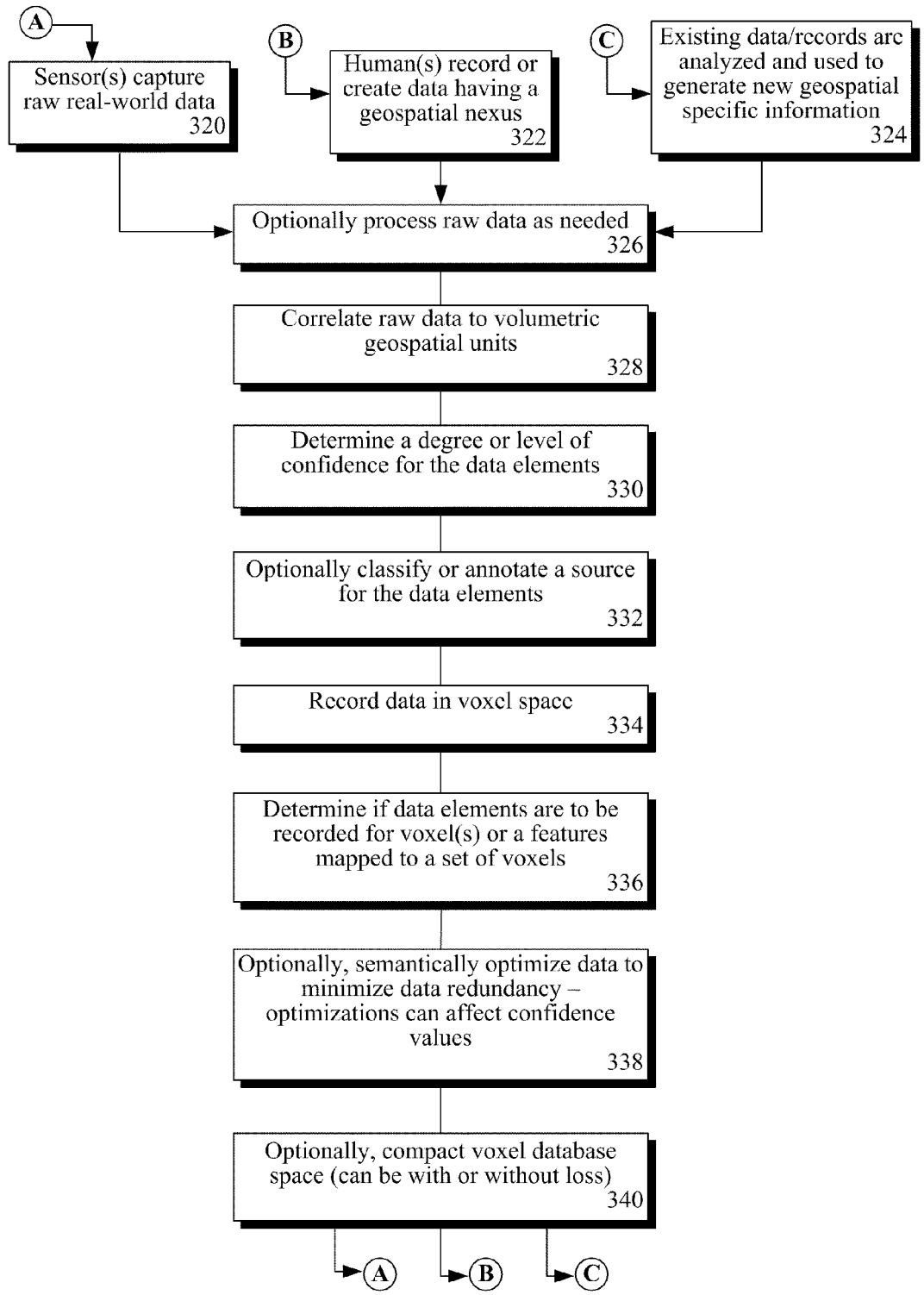
FIG. 3A is a flow chart of a process to acquire voxel database information from a data source in accordance with an embodiment of disclosure.

FIG. 3A shows a process 310 to acquire voxel database 130 information from a data source 150 in accordance with an embodiment of disclosure. In process 310 data can be continuously received from a variety of sources, which include completely automated data capture sources (step 320), human data sources (step 322), and generating new intelligence data (or other information) by analyzing and combining existing source data (step 324). This data can be continuously handled by the process, as represented by process 310 proceeding from step 340 to steps 320, 322, and/or 324. In process 310, data acquisitions and processes can occur in real-time or after an appreciable delay (e.g., handled in batch) depending upon implementation choices. Further, process 310 actions can occur asynchronously/synchronously as well as cyclically/randomly/based on conditional events depending on contemplated implementation choices.

Regardless of how raw data is gathered (step 320, 322, or 324), the data can be optionally processed as needed, as shown by step 326. In step 328, the raw data can be correlated to volumetric geospatial units and/or to populations present in the units. For example, data can be mapped to absolute or relative points in geographic space. In one embodiment, weather patterns, which are eventually mapped to simulation space 140 and which simulated force entities 144 variably respond to can be programmed based on weather and/or weather patterns extracted from a corresponding real-world volumetric space 110. Data can also be mapped to human and/or human sets, that reside within geographic space and that have an ability to move from one unit of geographic space to another. This information can be extracted and used to characterize behavioral elements of corresponding simulated force entities 144.

In step 330, a degree or level of confidence for the mapped data elements can be determined. In optional step 332, data elements can be classified in accordance to a source type and/or a specific data source can be tagged or otherwise related to the data elements.

The data elements can be recorded in voxel space meaning the data elements can be encoded into a voxel database, as shown by step 334. The voxel database can optionally establish features composed of one or more shape primitives. These features can be related, such as through relational database (RDBMS) indexes and database primary/secondary keys, to voxels. An RDBMS is one contemplated indexing tool and other indexing mechanisms can be used with the disclosure. When data elements are recorded in voxel space, a determination can be made as to whether each data element is to be referenced against a set of one or more voxels, against a defined feature, or both, as indicated by step 336.

In optional step 338, data can be semantically optimized to minimize data redundancy. For example, approximately equivalent data from multiple sources can be combined into a common data element. This semantic combination can affect confidence values associated with a data element. For example, when multiple sources report a single data element consistently, a confidence value in that data element will increase. In optional step 340, a voxel database space can be compacted to minimize storage requirements. Different voxel (e.g., raster-based) compaction algorithms can be utilized, which include loss-less compaction algorithms and lossy compaction algorithms.

Figure 3B:
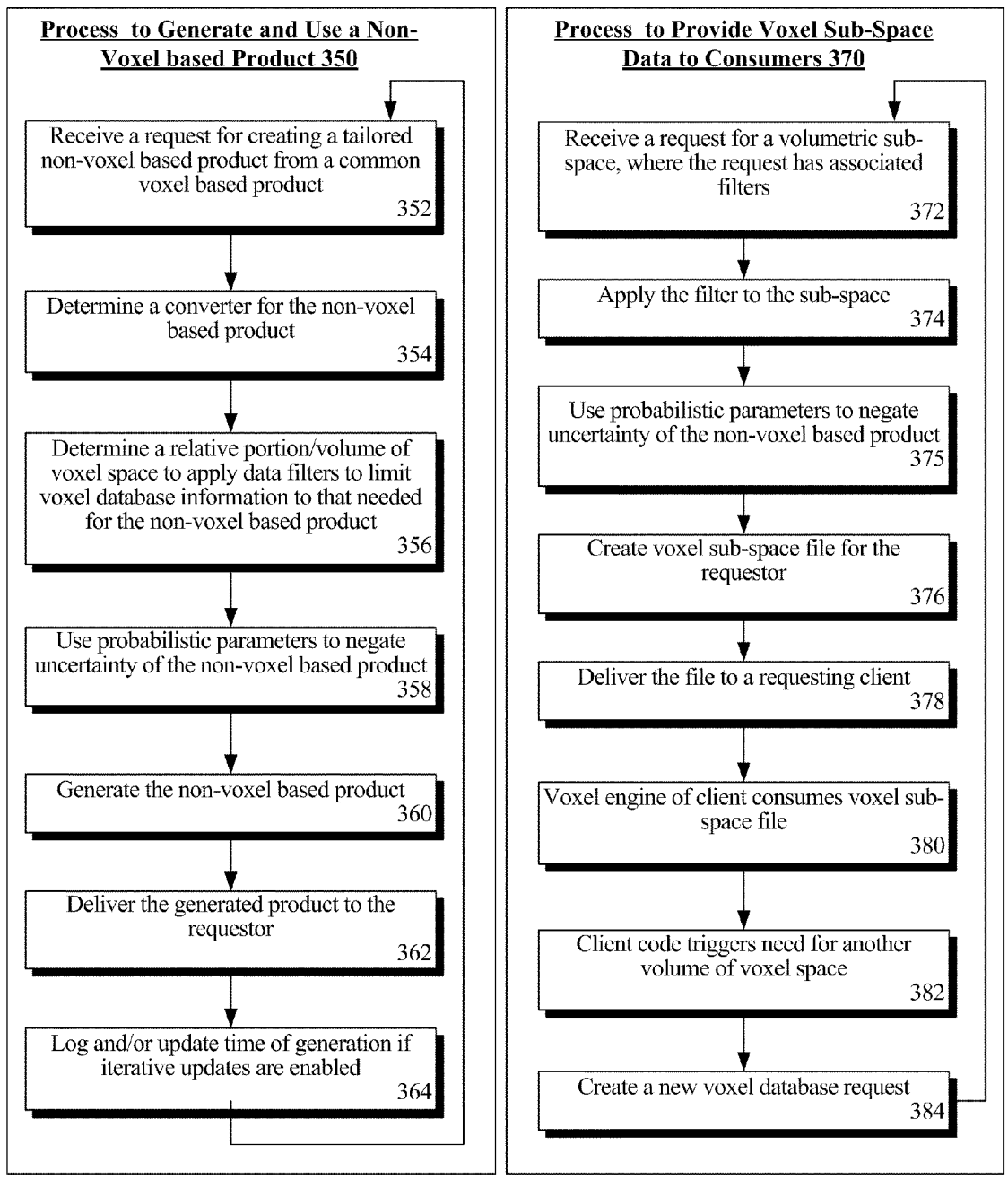
FIG. 3B is a set of flow charts for utilizing data of a voxel database in accordance with an embodiment of disclosure.

The voxel database populated through a process, such as process 310, can thereafter be treated as a common repository or centralized source for geospatially related information. This centralized source can be utilized by different consumers in different ways. In one scenario (process 350 shown in FIG. 3B), the voxel database can be used to generate a non-voxel based product, such as a SAF component. The behavioral model and associated dataset can be executed by a behavioral engine of a simulator. In another scenario (process 370 shown in FIG. 3B), the voxel database can provide voxel-subspace data sets to requestors, which these requestors can consume directly utilizing an internal voxel engine.

Process 350 can begin in step 352, where a request is received by a voxel database server. The request can be for creating a tailored non-voxel based product from a common voxel based product. An appropriate converter for the request can be determined in step 354.

In step 356, a relative portion or volume of voxel space needs to be determined. That is, the request will rarely be for an entire volume region stored by the voxel database, but will likely be for a volumetric subspace specifically needed by the non-voxel based product. Additionally, data within the requested volumetric subspace can be filtered by applied data filters, so that only the information needed for a specific product of the request is considered. In step 358, probabilistic parameters can be utilized to negate uncertainty inherent in the voxel database when generating the non-voxel based product. Different thresholds and/or parameters can be utilized to determine what level of uncertainty is to be retained within the non-voxel based product, which is generated in step 360. The generated product can be delivered to the requestor in step 362.

Some generated products can require periodic updates form the voxel database in order to retain information currency. In one embodiment, optimizations can be implemented so that only relatively new information needs to be considered for some update operations. When iterative updates are a concern, information can be logged and/or time attributes of the voxel database can be updated as appropriate, which is shown by step 364. The process 350 can repeat as needed, which is expressed by proceeding from step 364 to step 352.

Process 370 can begin in step 372, where a request for a volumetric sub-space is received. The request can have a set of associated filters. Unlike process 350, it is contemplated that a requestor of process 370 can directly consume voxel encoded information. In step 374, the filter can be applied to the voxel sub-space to conditionally exclude data of the voxel database. This is important as the voxel database can be a centralized repository that stores a myriad of data attributes in a voxel related manner, where only a subset of the data attributes are of concern for a specific requestor. In optional step 375, probabilistic parameters can be applied to negate uncertainty when generating the voxel sub-space. This optional step 375 can be utilized when satisfying a request (step 372) for a non-probabilistic voxel subspace.

In step 376, a file (or set of files) containing the requested information can be created. In step 378, the created file(s) can be delivered to a requesting client, such as by delivering the file(s) over a network. A voxel engine of the client can consume or utilize the voxel sub-space file, as shown by step 380. In one embodiment, the voxel database can be directly accessible and used by the clients, in which case a creation and utilization of a locally create file (of a voxel subspace) can be unnecessary.

In one embodiment, the voxel sub-space files can be encoded in a local media storage area (e.g., hard drive) for use by a client as needed. This prevents a need for continuous and/or stable network connectively between the client and the voxel database. In one embodiment, suitable voxel sub-space laden files can be encoded in a portable medium (e.g., optical, magnetic, or other) and disseminated/located to clients periodically.

In another embodiment, data sets can be continuously requested by a client as a SAF component needs a data set for a different volumetric space. That is, executing client code can trigger a need for another volume of voxel space, as shown by step 382. When no local cache exists for this needed information, a new voxel database request (submitted over a network) can be created, as shown by step 384, which results in the request being handled in step 372.

Figure 4:
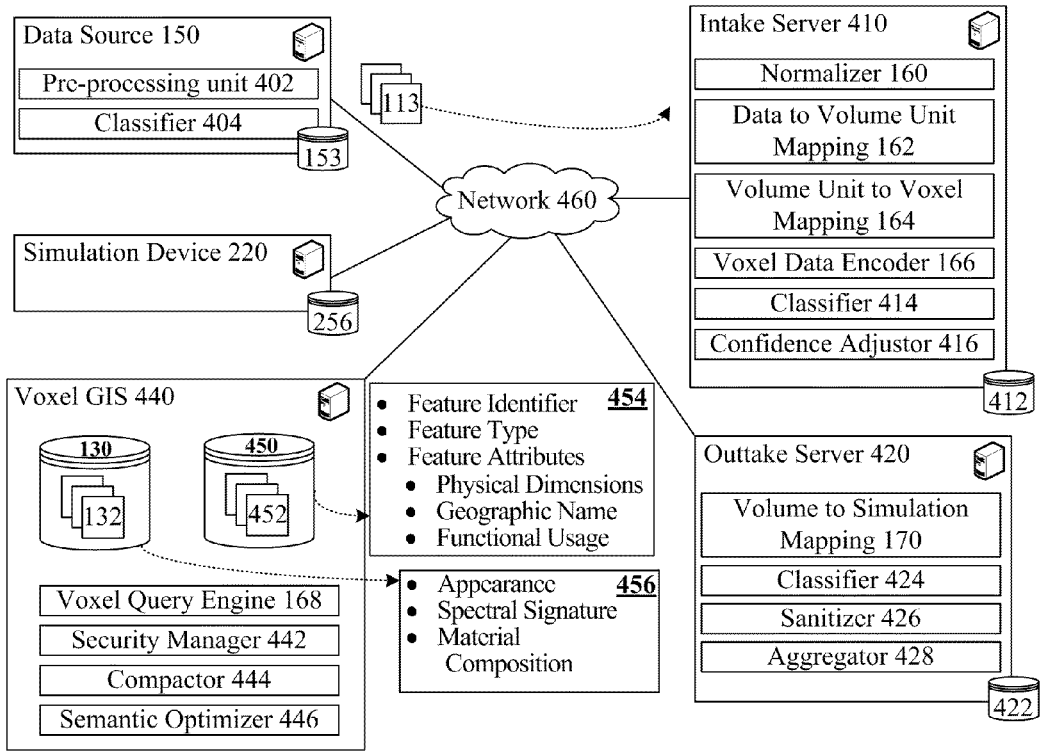
FIG. 4 is a schematic diagram of a system including a voxel database in accordance with an embodiment of disclosure.
Figure 5:
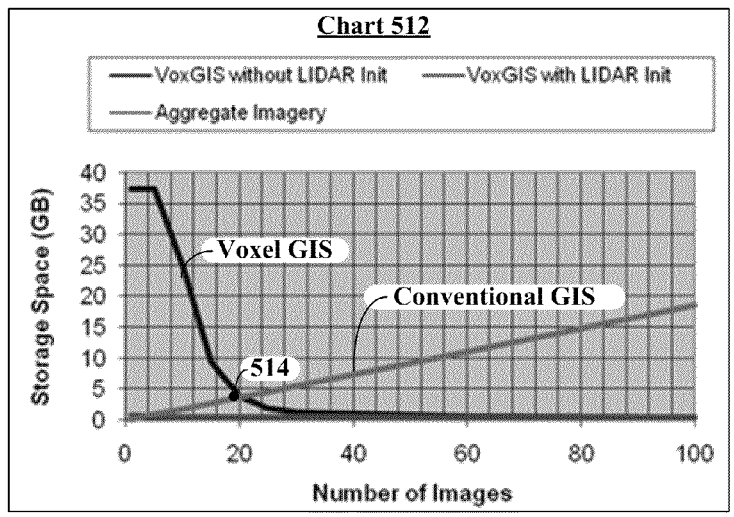
FIG. 5 demonstrates aggregation efficiency of a voxel database and a relationship between voxels, shapes, and features in accordance with an embodiment of disclosure.
Figure 5:
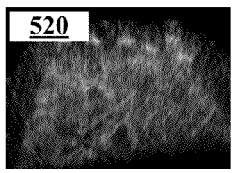
Figure 5:
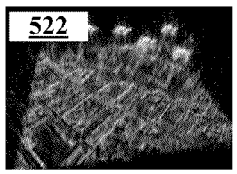
Figure 5:
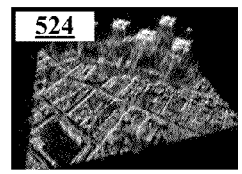
Figure 5:
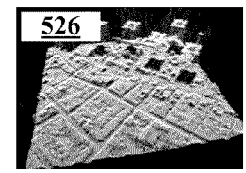
Figure 5:
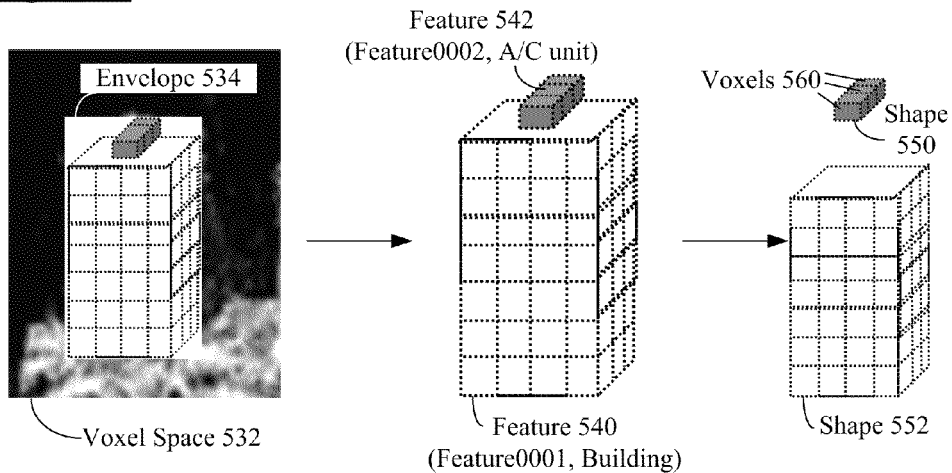

FIG. 4 is a schematic diagram of a system 400 including a voxel database 130 in accordance with an embodiment of the inventive arrangements disclosed herein. In system 400, a set of data sources 150, a set of simulation devices 210, an intake server 410, an outtake server 420, a Voxel geographic information system 440, and other such components can be communicatively linked via a network 460. In lieu of connectivity via network 460, components of system 400 can exchange information via portable media data exchanges, paper document correspondences, human-to-human communications, and the like. The shown components (as items 150, 410, 420, 210, 440) represent one embodiment of the disclosure and are not to be construed as being a limitation of the disclosure's scope.

Various components of system 400, such as items 150, 410, 420, 210, 440, can include one or more computing devices 470, which can include hardware 480 and computer program products 490. The computing devices 470 can be general purpose computing devices, such as personal computers, servers, or in-vehicle computers. The devices 470 can also be special purposed devices specifically manufactured/constructed for a tailored purpose. A special purposed device can have unique hardware, electronic boards, firmware, etc, which is not able to be easily modified by software and used for a different purpose. In various embodiments, devices 470 can be implanted as stand-alone devices, as virtual devices, as distributed devices, as cooperative devices, and the like.

Hardware 480 can include a processor 482, nonvolatile memory 483, volatile memory 484, network transceiver 485, and other components linked via a bus 486. The computer program products 490 can include programmatic instructions that are digitally encoded in a memory (e.g., memory 483, 484) and able to be executed by the processor 482. Computer program products 490 include boot firmware 492, (e.g., basic input/output system (BIOS)), an optional operating system 493 (i.e., special purposed devices can be optimized so an operating system 493 is merged with applications 494 and/or modules 495), applications 494, and other executable modules 495. The operating system 493 can include mobile device operating systems, desktop operating systems, server operating system, virtual operating systems, and/or distributed operating systems.

Unlike many computing systems, system 400 can be a security sensitive one where data classifications are highly important. That is, information acquired from data sources 150, stored in VOX GIS 440, and used to drive simulation devices 210 can include unclassified, secret, top secret (including compartmentalizations) information. Classification components 404, 414, 424 can exist, which implement comprehensive and conservative rules to automatically classify information into appropriate classifications. Additionally, sanitizers (e.g., sanitizer 426) can be used in system 400 to downgrade semantic content (e.g., from secret to unclassified, for example) of conveyed data elements to ensure that classification based restrictions are not violated. Moreover, different network 460 channels and information handling standards can be imposed based on classification level of the information being conveyed. A further complication is that aggregating and/or analyzing data from different sources 150 can change a classification level of the base data. Automated mechanisms (i.e., classifier 414, aggregator 428, and/or Voxel GIS 440, when aggregating data from multiple sources 150, can reevaluate and appropriately adjust resultant security classification levels) to conservatively handle data classifications are needed in system 400, especially in embodiments where data acquisition to model production (e.g., duration 212 of embodiment 210, for instance) is expedited.

The security sensitivity requirements can result in physically separate channels (e.g., within network 460, for example) for information conveyance. Further, storage regions for the different data classifications (e.g., within Voxel GIS 440, for example) can remain isolated from each other. Known standards for handling classified information exist as do a myriad of automated techniques, which can be utilized for system 400. Various components (classifier 404, 414, 424, security manager 442, sanitizer 426) are shown in system 400 to express that system 400 can implement security classification technologies. Comprehensive coverage of these known technologies is not the focus of this disclosure. For simplicity of expression, classification techniques have not been overly elaborated upon herein. It should be understood that integration of classification specific techniques for information handling are contemplated for the disclosure.

It should also be acknowledged that the specific arrangements of system 400 are expected to vary from implementation-to-implementation. For example, discrete network 460 attached servers are shown for intake (intake server 410) and outtake (outtake server 420) of information to and from the Voxel GIS 440. As shown, intake server 410 can perform intake processing operations (process 310, for example). Outtake server 420 can perform out taking processing operations (process 350 and/or 370, for example). In one embodiment, operations attributed to server 410 or 420 can be integrated into the Voxel GIS 440 or other system 400 components (e.g., one or more intake server 410 operations can be performed by data source 150; one or more outtake server 420 operations can be performed by simulation device 210). For example, in one embodiment, pre-processing unit 402 can optionally perform operations described for normalizer 160 and/or data to volume unit mapping component 162.

Additional components not explicitly expressed in association with system 400, which are consistent with performing operations described in the disclosure, are to be considered present in system 400. Further, logical mappings from system 400 components to operations described herein are assumed to be present. For example, in various contemplated embodiments, compactor 444 can perform operations described in step 340 of FIG. 3A; semantic optimizer 446 can perform operations described in step 338 of FIG. 3A; and, confidence adjustor 416 can perform operations previously described in step 330 and 338. Further, operations of the output generator 172 are to be considered as being performed by components of simulation device 210.

Turning to Voxel GIS 440, a number of characteristics should be noted. First, as new information for Voxel GIS 440 is acquired (from data sources 150), a probability distribution of surface location and surface appearance can be dynamically and programmatically constructed (using Bayesian statistical learning algorithms, for example). In this sense, voxels of the GIS 440 do not store a fixed appearance (of volume units 112 from a real-world volumetric space 110) but instead store a dynamic probability of multiple appearances, which can be learned and/or refined over time.

This characteristic of GIS 440 not only permits efficient handling of uncertainty, but turns traditional data overload challenges into an advantage. That is, over time, information acquisition via satellites, SIGINT, and other automated sources has geometrically increased. Concurrently, a quantity of human analysts responsible for rapidly responding to acquired information has decreased and/or remained constant. In the past, different information channels or products from different sources 150 were handled in a stove-piped manner. Different human analysts would receive and/or analyze satellite data, SIGINT data, HUMINT, PHYOP data, and the like. One result of this situation is that collected data is often not be analyzed in a timely manner. Additionally, collected data is typically analyzed in isolation (e.g., single images from satellites are analyzed by people lacking pertinent geospatial related data from other sources 150). Fusion tools are currently deficient and/or lacking, which is a situation expected to worsen in absence of a paradigm shift in how information is managed and analyzed. The Voxel GIS 440 is a central component for this needed paradigm shift.

To elaborate using diagram 510, Voxel GIS 440 is able to efficiently aggregate information. This aggregation efficiency actually accelerates as information density increases. For example, as a number of images encoded within GIS increases, Voxel GIS 440 storage requirements can actually decrease (or at least become more efficient than the straight line increase experienced using a traditional GIS). Aggregation efficiency results from the "holographic-like" nature of voxel storage space, where an increase in information density increases clarity of the voxel space 120. Uncertainty is reduced, which can reduce storage requirements (e.g., decreasing overhead needed for maintaining "noise" or abnormal data points in voxel space 120).

Aggregation efficiency of the Voxel GIS 440 is represented in diagram 510 by a set of images 520-526 of a stored voxel space. The images 520-526 are static geospatial images of real-world terrain taken from satellite images, yet the demonstrated principle is consistent regardless of the specific input being encoded in voxel space. For example, as more information is captured for individuals in a population, social characteristics of the population become increasingly refined.

Image 520 shows a visual depiction of a voxel space formed from ten images. Image 522 shows the same voxel space after 20 images have been processed. Image 524 shows the voxel space after 30 images. Image 526 shows same voxel space, that has been refined using LIDAR points in conjunction with the thirty images. As shown, it becomes evident that an increase in information density decreases uncertainty of an encoded voxel space and increases "fidelity" of the stored information. That is, as information density increases surface probabilities become better defined. More voxels (and associated data) in "empty space" can be discarded.

It can be mathematically shown that as information density approaches infinity, storage space requirements for the Voxel GIS 440 approaches (effectively equals) a theoretical minimal storage space required by the imagery (and/or data elements being stored). At relatively low information densities (compared to that currently being handled by intelligence agencies) a cross-over point 514 occurs, where it is more efficient to store equivalent data within a Voxel GIS 440 than it is to store equivalent data in a non-voxel GIS (e.g., a conventional GIS). Post cross-over point 514 voxel GIS 440 storage space advantages continue to increase, as shown by chart 512. It should be noted that although many examples presented herein are in context of intelligence activities, Voxel GIS 440 aggregation efficiencies and techniques are domain independent can be used for any geospatial data set. In voxel database 440 information can be indexed against voxels in different manners. In one embodiment, some records 132 can be directly indexed against uniquely identified voxels (in voxel database 130, for example). Other records 452 can be indexed against features, which are stored in a feature data base 450. Cross indexing between voxel database 130 and feature database 450 can occur.

A feature can be a representation of an object in a physical world (or a simulated object) having its own unique identity and characteristics. Buildings, trees, highways, rivers, lakes, and the like are examples of features. A volume in voxel space 120 occupied by a feature can be defined by a volumetric envelope. The volumetric envelope can be composed of one or more shape primitives. Shape primitives can be a set of basic volumetric shapes that are easily defined by a relatively small number of numeric parameters.

When features and voxel references are both stored in the voxel GIS 440, different consistent semantic mappings can be utilized. In one embodiment, voxel-level semantic content 456 can include spectral signature attributes (e.g., Multispectral Imaging (MSI), Hyperspectral Imaging (HSI), etc.), visual attributes (relating to a human's sense of sight), olfaction attributes (relating to a human's sense of smell), audition attributes (relating to a human's sense of hearing), gustation attributes (relating to a human's sense of taste), somatosensory attributes (relating to a humans sense of touch, temperature, proprioception, and nociception), material composition attributes, and the like.

Diagram 530 provides an illustrated example for describing features. In diagram 530, an envelope 534 of a voxel space 532 can contain features 540 and 542. Feature 540 can be uniquely identified as Feature0001, which is a feature identifier. The feature type of Feature 540 can be a building. Feature 542 can be an air conditioning unit positioned on top of the building. As shown, each feature 540, 542 is formed from single shape primitives 550 and 552, which are both boxes. Features can include any number (from 1 to N) of shape primitives. Each shape can include (be mapped to) a set of voxels. For example, three voxels 560 can form shape 550. In one embodiment, the voxel GIS 340 can include software implemented tools to automatically detect and define shapes, features, and envelopes in a given voxel space.

While any number of shape primitives can be supported by system 400, some common shape primitives include boxes, cylinders, spheres, and cones.

In one embodiment, shape primitives used by system 400 can conform to existing standards for enhanced compatibility. For example, shape primitives can conform to Open Graphics Library (OpenGL) standards for 3D computer graphics. In one embodiment, Coin3D, which is a C++ object oriented retained mode 3D graphics Application Program Interface (API) used to provide a higher layer of programming for OpenGL, objects can be mapped to shape primitives as follows: a box equates to a SoCube; a cylinder equates to a SoCylinder; a sphere equates to a SoSphere; and, a cube equates to a SoCone. In another embodiment, mappings to geospatial scheme of the National Geospatial-Intelligence Agency (NGA) can be as follows: a box equates to a RectangularPrism; a cylinder equates to a Vertical Cylindrical; a sphere equates to a spherical; and, a cube can have no equivalent. In still another embodiment, mappings to a computer aided design (CAD) scheme can be as follows: a box equates to an Axis Aligned Bounding Box (AABB); a cylinder equates to a Cylinder, Flat Ends; a sphere equates to a Cylinder, Round Ends, Zero Length; and, a cube can have no equivalent.

In one embodiment, the voxel query engine 167 of the Voxel GIS 440 can perform seamless and user transparent queries across the different databases 130, 450. It should be noted, that although being referred to as different databases 130, 450 a single unified database (or other indexed repository) can be utilized in the disclosure for both voxel-indexed records 132 and feature indexed records 452.

FIG. 6 illustrates a set of tables 610, 620, 630, 640 for a voxel GIS in accordance with an embodiment of the disclosure. In one embodiment, the tables 610, 620, 630, 640 can be RDBMS tables in third normal form. The tables 610, 620, 630, 640 can include a plurality of records (e.g., records 132 and 452).

Voxel table 610 includes a VID 612, which is a unique identifier for each voxel. SID 613 can be a unique identifier for a shape primitive which forms all or part of a shape envelope. Any quantity (1 . . . N) of attributes can be associated with each unique voxel of table 610. For example, each detailed semantic content element 456 can have an associated attribute 614, 616. In one embodiment, each attribute 614, 616 in the voxel table 610 can have at least two values, such as a lower value and an upper value. The multiple values can be used to record different levels of certainty for each attribute 614, 616. For example, one source can report a first value of an attribute 614, 616 with a definable degree of certainty and a different value can be reported for the same attribute 614, 616 with a different degree of certainty. Although two values (lower and upper) are shown for each attribute 614, 616, any number of values (1 . . . N) can be used in table 610.

Each record in shape table 620 can includes a unique shape identifier, SID 622. A secondary key for a feature ID 624 can also be included. Table 620 can also include a type 626 attribute. A set (0 . . . N) of additional shape specific attributes 628 can also exist.

Each unique feature can be associated with a feature identifier, FID 632. In one implementation, different types of tables 630, 640 can exist, one for each unique category or type of object, which corresponds to a feature. For example, one table 630 can exist for buildings and another table 640 can exist for tree groves. Each table 630, 640 can have an associated set of attributes 634, 644, which are unique to a specific type of object. It should be appreciated that arrangements of tables 610, 620, 630, 640 are presented to illustrate a concept expressed herein and are not to be construed as a limitation of the disclosure.

The disclosure may be embodied as a method, system, or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the disclosure may take the form of a computer program product on a computer-usable storage medium having computer-usable program code embodied in the medium. In a preferred embodiment, the disclosure is implemented in software which includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, or transport the program for use by or in connection with the instruction execution system, apparatus, or device. Any suitable computer-usable or computer-readable medium may be utilized. The computer-usable or computer-readable medium may be, for example but not limited to, an electronic, magnetic, optical, electromagnetic, infrared, or semiconductor system, apparatus, or device. Examples of a computer-readable medium include a semiconductor or solid state memory, magnetic tape, a removable computer diskette, a random access memory (RAM), a read-only memory (ROM), an erasable programmable read-only memory (EPROM) or Flash memory, a rigid magnetic disk and an optical disk. Current examples of optical disks include compact disk-read only memory (CD-ROM), compact disk-read/write (CD-R/W) and DVD.

Computer program code for carrying out operations of the disclosure may be written in an object-oriented programming language such as JAVA, Smalltalk, C++, or the like. However, the computer program code for carrying out operations of the disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The diagrams in FIGS. 1-6 illustrate the architecture, functionality, and operation of possible implementations of systems, methods, and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating data sets for an interactive three dimensional (3D) environment with interactive entities comprising:
    identifying a volumetric storage unit (VSU) database representing a volumetric storage space comprising a set of unique volumetric storage units, wherein data elements are stored to a subset of the VSUs, wherein a spatial position of the data elements within the volumetric storage space is defined at least in part by the subset of the VSUs, wherein the VSU database is a component of a geographic information system, which also includes a feature database comprising a plurality of feature records in a plurality of feature tables, which are indexed against VSUs in the VSU database, and wherein each feature corresponds to a real world three dimensional object; and
    determining a set of objects contained within a volume of the volumetric storage space by processing a set of data elements extracted from the VSU database, wherein the set of data elements are stored in a subset of the VSUs that correspond to the volume, wherein the set of objects were not explicitly stored as discrete objects within the VSU database but were defined in the data elements of the volumetric storage space and were discernible once the data elements were processed, wherein the set of objects affect behavior of a plurality of three-dimensional (3D) entities within a sub-volume of simulation space corresponding to the volume of the volumetric storage space.

2. The method of claim 1, further comprising:
gathering geospatial information specific to a real-world volumetric space; and
storing the geospatial information in the volumetric storage space as specific ones of the data elements, wherein said sub-volume of simulation space comprises the plurality of 3D entities, which are able to dynamically move and react in the simulation space in a geospatially constrained manner in accordance with computer controlled logic and user-provided input.

3. The method of claim 1, wherein the data elements of the volumetric storage space when stored in the VSU database are referenced against VSUs and are not directly referenced against other defined objects present in the volumetric storage space.

4. The method of claim 1, wherein the simulation space is an interactive space of a semi-automated force (SAF) application, and wherein each of the 3D entities are simulated force entities of the semi-automated force (SAP) application.

5. The method of claim 1, further comprising:
directly inserting the set of data elements from the VSU database into application components of an interactive 3-D application, wherein the application components generate three-dimensional user interfaces for the simulation space and control behavior of the 3D entities within the simulation space, wherein at least one of the application components is a terrain component, which comprises a VSU encoded terrain map corresponding to at least a portion of the real-world volumetric space, and which is directly consumable by a raster-based terrain engine of a simulation device presenting the three-dimensional user interfaces that expresses the simulation space.

6. The method of claim 1, wherein the simulation space is a geo-specific synthetic environment of a battlefield, and wherein the simulated force entities comprise military personnel, military vehicles, and civilians.

7. The method of claim 1, further comprising:
directly inserting the set of data elements from the VSU database into application components of an interactive 3-D application, wherein the application components generate three-dimensional user interfaces for the simulation space and control behavior of the 3D entities within the simulation space, and wherein one of the application components comprises an area component defining temporally dynamic characteristics of the simulation space based on corresponding temporally dynamic conditions of the real-world volumetric space.

8. The method of claim 2, wherein the geospatial information specific to the real world volumetric space comprises weather conditions, wherein the data elements of the volumetric space define weather conditions approximately equivalent to those of the geospatial information, and wherein the weather conditions of the data elements are expressed in the simulation space in a manner corresponding to the weather conditions detailed in the geospatial information.

9. The method of claim 1, further comprising:
directly inserting the set of data elements from the VSU database into application components of an interactive 3-D application, wherein the application components generate three-dimensional user interfaces for the simulation space and control behavior of the 3D entities within the simulation space, and wherein, one of the application components comprises an entity behavior component defining behavioral characteristics of one of the 3D entities based on corresponding behavioral characteristics discernible from the geospatial information.

10. The method of claim 1, further comprising:
directly inserting the set of data elements from the VSU database into application components of an interactive 3-D application, wherein the application components generate three-dimensional user interfaces for the simulation space and control behavior of the 3D entities within the simulation space, wherein one of the application components comprises a component for at least one simulated human, which is one of the 3D entities, and wherein the entity specific intelligence for the simulated human is based on behavior of a specific real-world human as discernible from the geospatial information.

11. A computer program product for creating data sets for an interactive three-dimensional (3D) environment with interactive entities comprising:
a tangible non-transitory computer readable storage medium having computer usable program code embodied therewith, the computer usable program code comprising:
computer usable program code operable to identify a volumetric storage unit (VSU) database representing a volumetric storage space comprising a set of unique volumetric storage units, wherein data elements are stored to specific ones of the VSUs, wherein a spatial position of the data elements within the volumetric storage space is defined at least in part by which of the VSUs the data elements are stored wherein the VSU database is a component of a geographic information system, which also includes a feature database comprising a plurality of feature records in a plurality of feature tables, which are indexed against VSUs in the VSU database, and wherein each feature corresponds a real world three dimensional object;
computer usable program code operable to gather geospatial information specific to a real-world volumetric space;
computer usable program code operable to store the geospatial information in the volumetric storage space as specific ones of the data elements;
computer usable program code operable to extract a set of data elements from the VSU database for a volume of the volumetric space to be used for a corresponding volume of simulation space, said volume of simulation space comprising a plurality of 3D entities that are able to dynamically move and react in the simulation space in a geospatially constrained manner in accordance with computer controlled logic and user-provided input; and
computer usable program code operable to determine a set of objects contained within a corresponding volume of simulation space by processing the set of data elements extracted from the VSU database, wherein the set of objects were not explicitly stored as discrete objects within the VSU database but were defined in the data elements of the volumetric storage space and were discernible once the data elements were processed, wherein the set of objects contained in the simulation space affect behavior of the plurality of 3D entities within the simulation space.

12. A system for creating data sets for an interactive three-dimensional (3D) environment with interactive entities comprising:
a processor;
a non-volatile memory;

a volatile memory;

a plurality of input devices;

a plurality of output devices, wherein said different output devices generate output for at least two different senses;

a bus communicatively linking the processor non-volatile memory, volatile memory, the input devices, and the output devices to each other;

at least one computer program product tangibly stored on the non-volatile memory or the volatile memory, wherein instructions of the computer program product are executable by the processor, which when executed cause the system to:

identify a volumetric storage unit (VSU) database representing a volumetric storage space comprising a set of unique volumetric storage units, wherein data elements are stored to a subset of the VSUs, wherein a spatial position of the data elements within the volumetric storage space is defined at least in part by the subset of the VSUs, wherein the VSU database is a component of a geographic information system, which also includes a feature database comprising a plurality of feature records in a plurality of feature tables, which are indexed against VSUs in the VSU database, and wherein each feature corresponds to a real world three dimensional object; and determine a set of objects contained within a volume of the volumetric storage space by processing a set of data elements extracted from the VSU database, wherein the set of data elements are stored in a subset of the VSUs that correspond to the volume, wherein the set of objects were not explicitly stored as discrete objects within the VSU database but were defined in the data elements of the volumetric storage space and were discernible once the data elements were processed, wherein the set of objects affect behavior of a plurality of 3D entities within a sub-volume of simulation space corresponding to the volume of the volumetric storage space.

13. A method for creating data sets for an interactive three-dimensional (3D) environment with interactive entities comprising:

obtaining a plurality of sensor captured products each from a real-world volumetric space;

combining the sensor captured products together in a volumetric storage unit (VSU) database, wherein the VSU database represents a volumetric storage space comprising a set of unique volumetric storage units, wherein data elements are stored to specific ones of the VSUs, wherein a spatial position of the data elements within the volumetric storage space is defined at least in part by which of the VSUs the data elements are stored, wherein each VSU of the VSU database comprises information from the plurality of sensor captured products that relates to the corresponding volumetric unit of the volumetric storage space wherein the VSU database is a component of a geographic information system, which also includes a feature database comprising a plurality of feature records in a plurality of feature tables, which are indexed against VSUs in the VSU database, and wherein each feature corresponds to a real world three dimensional object;

receiving a 3D product generation request, said 3D product generation request specifying a bounded simulation space volume for a related 3D product;

querying the VSU database for a set of VSU units contained within a volume of volumetric storage space corresponding to the bounded simulation space; and generating a product data set for the bounded simulation space volume, wherein the product data set comprises visual information necessary to drive a VSU graphics engine of the related 3D product to render a three-dimensional environment for the bounded simulation space and comprises non-visual semantic information necessary to drive behavior of 3D entities interacting within in the bounded simulation space.

14. The method of claim 13, wherein the sensor captured products comprise satellite imagery, digital elevation models (DEMs), and captured video of the real-world volumetric space.

15. The method of claim 13, further comprising:

creating vehicle behavior models for vehicle entities, which are specific ones of the 3D entities), from guidance software of unmanned vehicles, wherein the guidance software is one of the captured products of the real-world volumetric space, which is digitally encoded into the VSU database.

16. The method of claim 13, further comprising:

identifying working software modules used in unmanned vehicle guidance systems for navigating the real-world volumetric space, wherein the working software modules comprise a VSU based navigation engine; and including the working software modules in the product data set, wherein the working software modules are directly used by the 3D product to control navigation functions of a simulated vehicle as it moves within the bounded simulation space.

17. The method of claim 13, wherein the 3D product is a Semi-Automated Force product.

18. The method of claim 13, wherein the non-visual semantic information comprises temporally dynamic characteristics of the simulation space based on corresponding temporally dynamic conditions of the real-world volumetric space, wherein said temporally dynamic characteristics includes weather conditions of the simulation space that correspond to weather conditions of the real-world volumetric space.

19. The method of claim 13, wherein non-visual semantic information further comprises behavioral characteristics of a computer generated force entity based on corresponding behavioral characteristics entities of a corresponding entity physically present in the real-world volumetric space wherein said behavioral characteristics were inferred from the sensor captured products.

20. A computer program product for creating data sets for an interactive three-dimensional (3D) environment with interactive entities, the computer program product comprising:

a tangible non-transitory computer readable storage medium having computer usable program code embodied therewith, the computer usable program code comprising:

computer usable program code operable to obtain a plurality of sensor captured products each from a real-world volumetric space;

computer usable program code operable to combine the sensor captured products together in a volumetric storage unit (VSU) database, wherein the VSU database represents a volumetric storage space comprising a set of unique volumetric storage units, wherein data elements are stored to specific ones of the VSUs, wherein a spatial position of the data elements within the volumetric storage space is defined at least in part by which of the VSUs the data elements are stored, wherein each VSU of the VSU database comprises information from the plurality of sensor captured products that relates to the corresponding volumetric unit of the volumetric storage space wherein the VSU database is a component of a geographic information system, which also includes a feature database comprising a plurality of feature records in a plurality of feature tables, which are indexed against VSUs in the VSU database, and wherein each feature corresponds to a real world, three dimensional object;

computer usable program code operable to receive a 3D product generation request, said 3D product generation request specifying a bounded simulation space volume for a related 3D product;

computer usable program code operable to query the VSU database for a set of VSU units contained within a volume of volumetric storage space corresponding to the bounded simulation space; and computer usable program code operable to generate a product data set for the bounded simulation space volume, wherein the product data set comprises visual information necessary to drive a VSU graphics engine of the related 3D product to render a three-dimensional environment for the bounded simulation space and comprises non-visual semantic information necessary to drive behavior of 3D entities interacting within in the bounded simulation space.

21. A system comprising:

a plurality of volumetric storage unit (VSU) records in a VSU table, wherein each of the records has a unique VSU identifier, wherein the VSU database is a component of a geographic information system, which also includes a feature database comprising a plurality of feature records in a plurality of feature tables, which are indexed against VSUs in the VSU database, and wherein each feature corresponds to a real world three dimensional object;

hardware and computer program products stored on a tangible non-transitory storage medium and executable upon said hardware, wherein said VSU table is stored in a tangible storage medium;

each VSU record comprising visual attributes of a geometric space, wherein uniquely defined VSUs of voxel VSU database is a volume unit on a grid in three dimensional space, which is a VSU space, wherein a one-to-one correspondence exists between VSUs in the VSU space and volume units of a real world volumetric space from which geospatial data was directly gathered and encoded within the voxel VSU database; and a plurality of entity records, wherein each record has a unique identifier for a three-dimensional 3D entity, each entity record being indexed against at least one VSU record within the VSU database, each entity record comprising a plurality of different attributes for characteristics of the corresponding 3D entity, said different attributes of the entity records comprising sufficient information to permit an interactive 3D application consuming the information to drive behavior of the corresponding 3D entity acting in a simulation space comprising simulation units, said simulation units corresponding to VSUs of the VSU database.

22. The system of claim 21, wherein data stored in the VSU database is probabilistic data that represents a level of uncertainty by incorporating inconsistent geospatial data from a plurality of different raw data sources.

23. The system of claim 22, wherein each of said characteristic attributes comprises a lower value and an upper value, wherein the lower value and upper value expresses a degree of uncertainty of that sensory attribute.

24. The system of claim 21, further comprising:

a plurality of feature records in a plurality of feature tables, wherein each of the feature records comprises a unique feature identifier, a feature type, and a plurality of feature attributes, wherein a feature corresponds to a real world object, wherein different feature tables are tables specific to different types of real world objects, and wherein the feature attributes of the feature tables are specific attributes for the real world objects, which vary from feature table to feature table; and a plurality of shape records in a shape table, wherein each of the shape records comprises a unique shape identifier, a shape type, a plurality of shape attributes, and a foreign key to a feature identifier, wherein types of shapes are primitive shapes that comprise a box, a cylinder, a sphere, and a cone, wherein a one-to-many relationship exists between features and shapes, wherein each record of the VSU table comprises a foreign key to a shape identifier, wherein a one-to-many relationship exists between voxels and primitive shapes.

* * * * *